No. 786,258. PATENTED APR. 4, 1905.
E. BELL.
BEET CHOPPER.
APPLICATION FILED APR. 9, 1904.
3 SHEETS—SHEET 1.
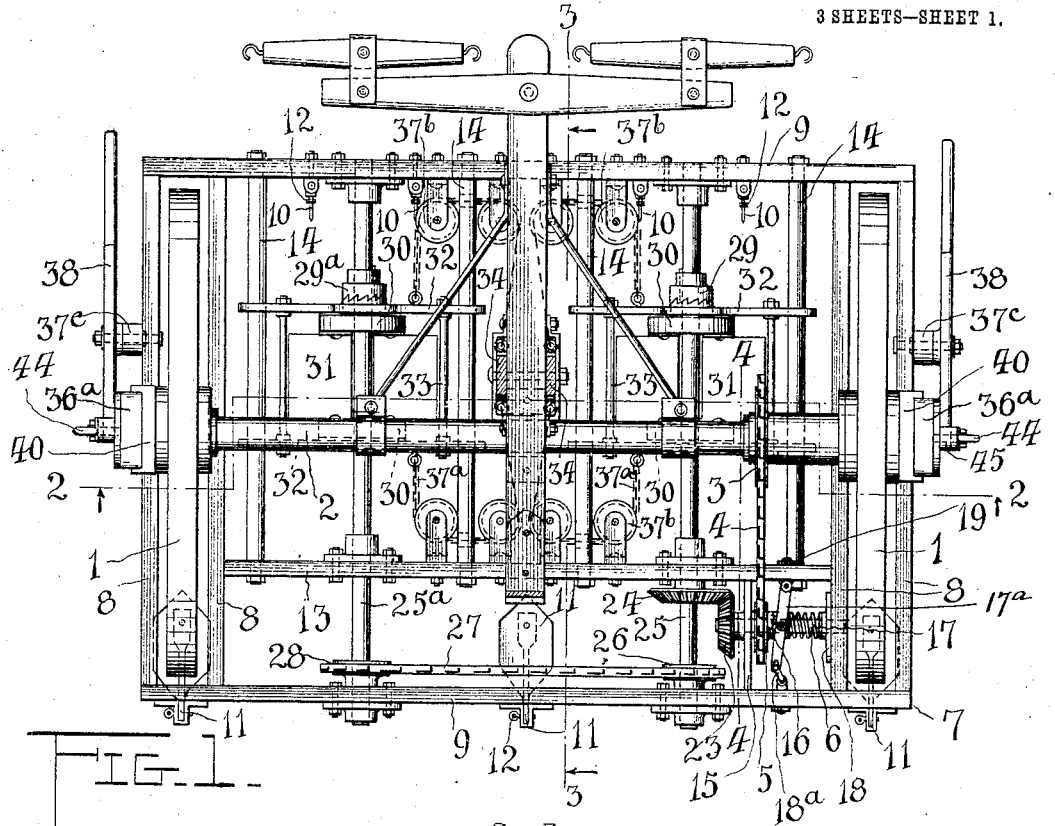
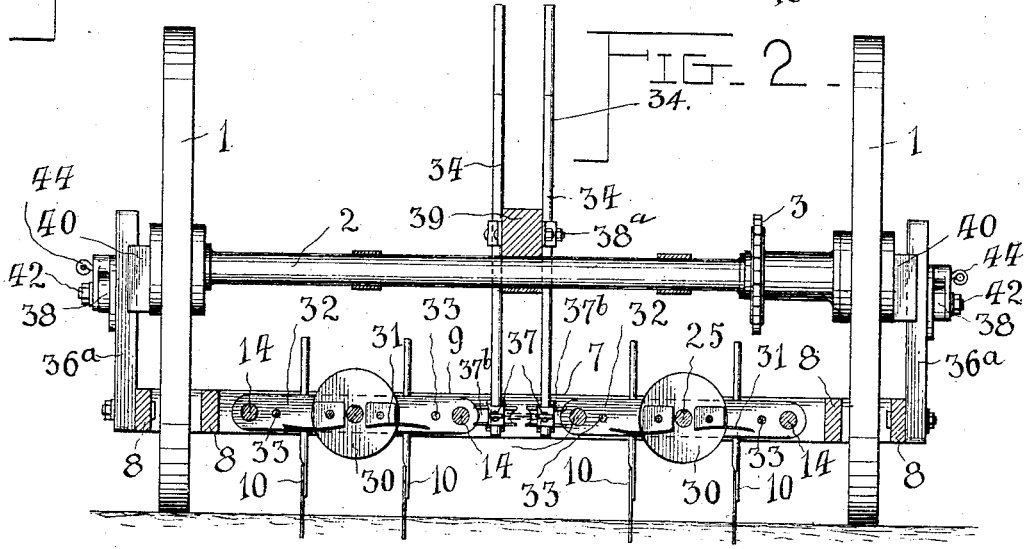
Witnesses: Edward Bell Inventor,
By Marion & Marion
Attorneys

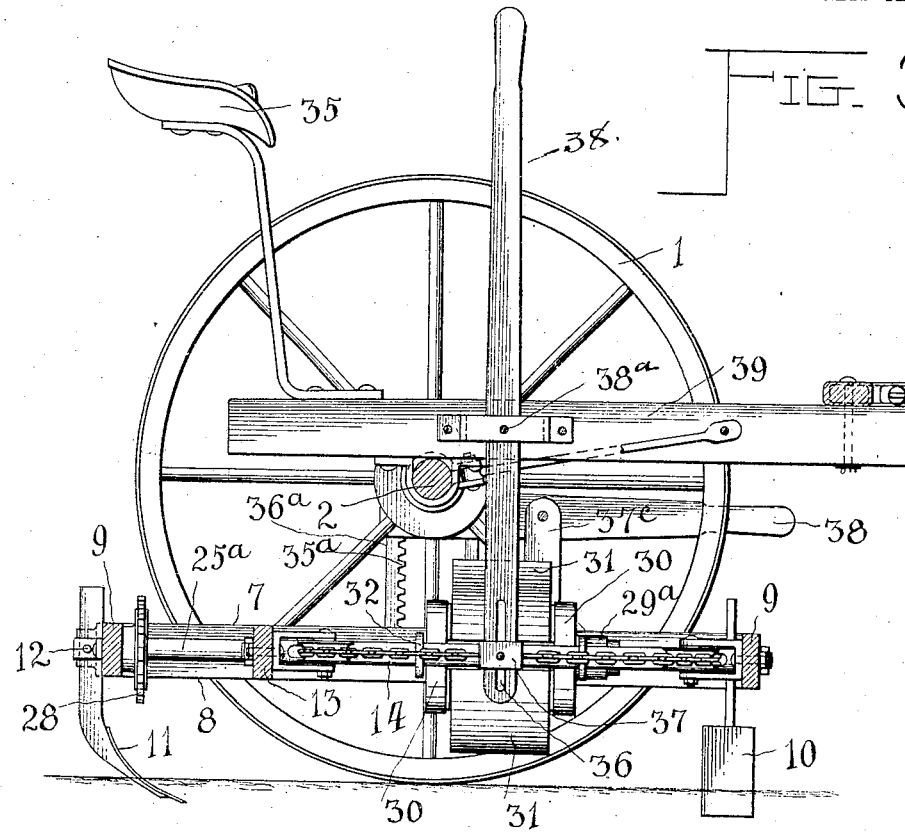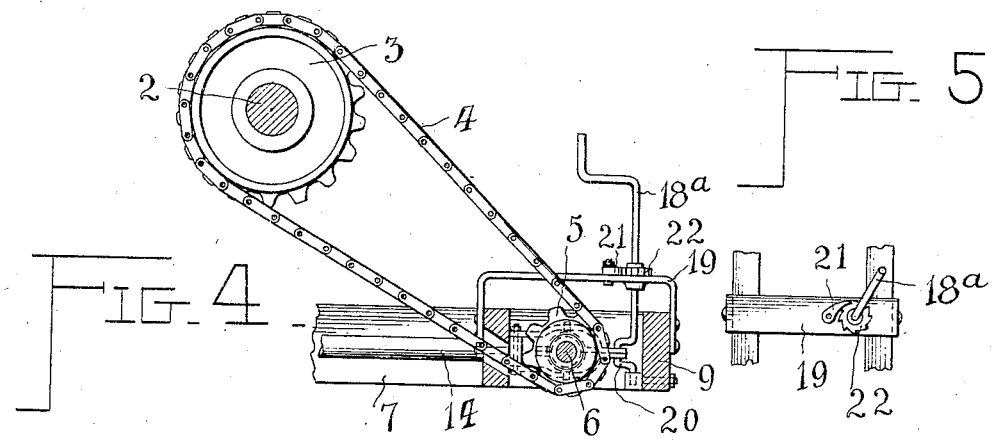

No. 786,258. PATENTED APR. 4, 1905.
E. BELL.
BEET CHOPPER.
APPLICATION FILED APR. 9, 1904.

3 SHEETS—SHEET 3.

Witnesses:
A. von Aesch
J. H. Gibbs

Edward Bell Inventor
By Marion & Marion
Attorneys

No. 786,258.

Patented April 4, 1905.

UNITED STATES PATENT OFFICE.

EDWARD BELL, OF TEESWATER, CANADA.

BEET-CHOPPER.

SPECIFICATION forming part of Letters Patent No. 786,258, dated April 4, 1905.

Application filed April 9, 1904. Serial No. 202,343.

*To all whom it may concern:*

Be it known that I, EDWARD BELL, a subject of the King of Great Britain, residing at Teeswater, county of Bruce, in the Province of Ontario, Canada, have invented certain new and useful Improvements in Beet-Choppers; and I do hereby declare that the following is a full, clear, and exact description of the invention, such as will enable others skilled in the art to which it appertains to make and use the same.

This invention relates to new and useful improvements in beet-choppers, the invention consisting of mechanism which is adapted to be drawn by horses over the surface of the ground for the purpose of thinning beets in the cultivation of beets for sugar, &c.

The object of the invention is to produce a machine of the character described which will be simple in construction and which may be rendered operative for the purpose described or which may be thrown out of connection, so as to perform no function in cutting the beet-tops except at predetermined times through the instrumentality of the rotatable cutting-blades, which are carried upon rotatable shafts adapted to render said cutting-blades operative.

Means are also provided in the form of knives or blades which are fixed to the main carrying-frame of the machine, so as to be normally in position for cultivating the soil or for contact with any growing vegetation beneath the surface of the soil.

The invention consists in certain features of novelty in the detail construction and arrangement of parts relating to the structure of the mechanism hereinafter described, all as hereinafter more fully described, and specifically pointed out in the claims.

Figure 6:
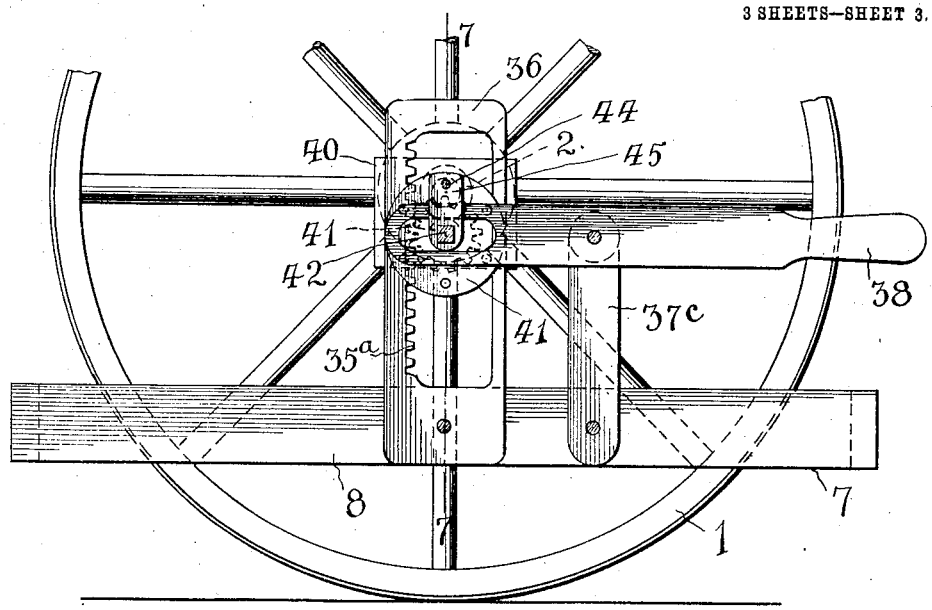
Figure 7:
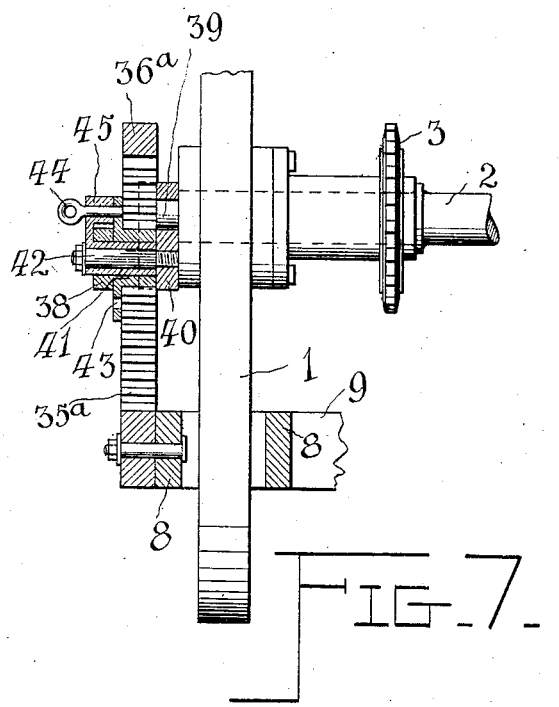
Figure 8:
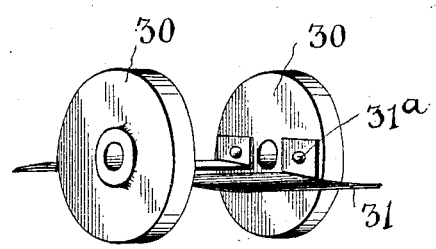

In the annexed drawings, in which similar numerals of reference indicate corresponding parts, Figure 1 is a plan view of a machine designed for the purpose described, illustrating in general details the manner of supporting the coöperative parts upon the main supporting-frame thereof. Fig. 2 is a transverse section taken on line 2 2 of Fig. 1 looking in the direction indicated by the arrows. Fig. 3 is a longitudinal section taken on line 3 3 of Fig. 1. Fig. 4 is a vertical longitudinal section taken on line 4 4 of Fig. 1, illustrating the driving means for the rotatable shafts hereinafter referred to. Fig. 5 is a fragmentary plan view of a clutch-operating means which is shown in Fig. 4. Fig. 6 is a fragmentary side elevational view illustrating the manner of raising the frame, which is hereinafter called the "implement-carrying" frame. Fig. 7 is a detached enlarged fragmentary view illustrating by a section taken on line 7 7 of Fig. 6 the connection of the lifting means from said carrying-frame to the main supporting-shaft, and Fig. 8 is a detail illustrating the manner of supporting the cutting-knives hereinafter referred to.

In raising beets for the purpose of manufacturing sugar it frequently becomes necessary to "thin out" the growing vegetation, so that the remaining beets will grow to a large size and be of more value for the purpose intended. Owing to the manner in which the soil is prepared and the beets grow, it is frequently found that some machine for the purpose described is necessary, and such machine should combine cutting-knives which are adapted to cut off vegetation above the ground and at the same time carry knives which will extend below the surface of the ground either for the purpose of cultivating the soil, or, if desired, to cut and destroy the beets below the surface. For that purpose I have devised the mechanism illustrated in the accompanying drawings, in which—

1 1 are carry-wheels supporting the main driving-shaft 2, upon which is mounted a sprocket-wheel 3, over which extends the sprocket-chain 4, which runs thence to the smaller sprocket 5 on the transversely-extended shaft 6. The shaft 6 and its appurtenant connections are supported in a vertically-movable carrying-frame 7, which is approximately rectangular in shape and extends outwardly beyond the wheels 1 and is provided with parallel side bars 8, each of which extends longitudinally of the line of draft, one at each side of each carrying-wheel, and are thence connected to the end bars 9 of the structure, thereby forming a rigid and very strong support for the mechanism carried thereby. On the front bar 9 are supported a plurality of cutting-blades 10, which are so arranged that the blade will extend parallel with the line of draft, thereby presenting a sharp edge which is adapted to enter the soil. Upon the rear bar 9 are supported shovel-blades 11, which are adapted to serve as cultivator-blades or for any other required purpose, both of said blades 10 and 11 being vertically adjustable by means of set-screws 12 in suitable supporting-guides connected with the said transverse bars 9. In the plan view in Fig. 1 it will be observed that a transverse bar 13 extends parallel with the rear bar 9, which bar 13 serves as a supporting means with which tie-rods 14, which extend to the forward cross-bars 9, are supported. Between the transverse bar 13 and the rear bar 9 is a supporting plate or bar 15, and journaled in the bar 15 and the right-hand inner bar 8 is the said shaft 6, upon which is supported the sprocket-wheel 5. Between the bar 8 and said sprocket-wheel is a clutch 16, while a spring 17, bearing against the plate 18 on the bar 8, serves normally to hold said clutch in engagement, so that rotation of the sprocket-wheel 5 will cause corresponding movement of the said shaft 6. Connected with the clutch 16 is a lever 17$^a$, which is pivoted to the transverse bar 13, while a vertically-projecting rod 18$^a$, supported in the yoke 19 and provided with the offset or crank portion 20, is adapted to move said clutch out of engagement when desired, a pawl and ratchet 21 and 22 being provided to hold said clutch out of engagement when the pawl is in engagement with said ratchet. Upon the shaft 6 is a bevel-gear 23, which meshes with a corresponding bevel-gear 24 upon the longitudinally-extended shaft 25. A sprocket 26 on the shaft 25 is adapted to rotate the shaft 25$^a$ through the sprocket-chain 27 and the sprocket-wheel 28 on said shaft 25$^a$. Therefore as the main driving-shaft 2 is rotated it will be evident that if the clutch 16 is in engagement to actuate the sprocket 5 both shafts 25 and 25$^a$ will be caused to rotate in the same direction. Upon both of said shafts 25 and 25$^a$ are clutches 29 and 29$^a$, adapted to engage with corresponding clutch members, which are supported upon the disks 30. Supported upon the disks 30 are cutting-knives 31, as best shown in Fig. 8, one of each of said disks in Fig. 1 lying under the driving-shaft 2 and the forward disks 30 only being shown, a plurality of said disks being disposed upon each shaft 25 and 25$^a$.

The disks 30 are supported in position upon the shafts 25 and 25$^a$, and yokes 32, connected by means of the longitudinally-extended rods 33, are connected with said disks and through the vertically-extended lever 34 are operable by the operator of the machine, who is supposed to occupy the seat 34, the levers 34 being longitudinally slotted at 36 and extending through the loops 37, connected with said yokes by chains 37$^a$, which pass over pulleys 37$^b$. The levers 34 are pivoted at 38$^a$ to the upper frame 39, which is supported upon the main driving-shaft 2, so that as the levers 34 are thrown back the yokes are thrown forwardly, so as to bring the clutch members on the shafts 25 and 25$^a$ into engagement. When this is done, the disks 30 will be connected to rotate with said shafts and perform their function in cutting vegetation, &c. When the levers 34 are in a normal position of rest, it will be evident that the cutting-knives 34 are normally inactive and perform no function in cutting. Thus it will be seen that where the operator is driving through a field and a portion of the vegetation above the ground will require no thinning the cutters may be left normally inoperative and the cultivator-blades be operative in cultivating the soil; but if a practiced eye observe a portion of the field in which the vegetation is too rank for good results the levers 34 may be shifted to bring the clutch members into engagement, and thereby thin the vegetation above the surface of the ground only at such points as prudence will dictate.

In some instances it may be desired to raise the supporting-frame, comprising the bars 8 9, &c., either to a greater or less elevation above the ground, in which case the mechanism shown in Figs. 6 and 7 becomes effective. Referring to those figures, it will be seen that connecting with the said bars 8, at each side of the machine, is a rack 35$^a$ in the yoke 36$^a$, which extends vertically above the main driving-shaft 2. Connected with said bars 8 are also provided links 37$^c$, pivoted to said bars and also pivotally connected with a lifting-lever 38. Upon the shaft 2, at its outer end, is preferably provided a reduced portion 39, and upon this reduced portion is loosely supported a collar 40. Supported in the collar 40 is a pinion 41, which is rotatable upon the pin 42, carried by said lever 38, while perforations 43 are provided in the angular flange of said pinion, and when the lever 38 is elevated to raise the carrying-frame above the ground the pin 44 may be projected through the collar 45 and into said pinion, thereby preventing rotation thereof upon its axis, and thus supporting said frame in its elevated position.

For convenience and to provide ready means of repair I prefer that the disk 30 shall be provided with plates 31, which have a cutting edge on the outer portion thereof, the said plates being provided with angularly-extended flanges 31$^a$, which are bolted or otherwise secured to the said disks 30, whereby an economical and simple cutting-plate may be provided, which can be manufactured upon the farm and will not require that it be sent to a factory in case of accident.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim, and desire to secure by Letters Patent, is—

1. In a device of the character described, the combination comprising wheels; an axle rigidly secured to the wheels; a frame supported by the wheels, composed of side members disposed outside the wheels, longitudinal members disposed inside of the wheels, a transverse member secured to said longitudinal members, and longitudinally-disposed tie-rods extending from said transverse member to the front of the frame; means secured on the outer ends of the axle for securing vertical adjustment of the frame; actuating mechanism composed of a sprocket on said axle, a transverse shaft, a sprocket thereon, a chain connecting said sprockets, a longitudinal shaft driven by said transverse shaft, a second longitudinal shaft, sprockets on said longitudinal shafts, a chain connecting said sprockets and a bearing for said longitudinal shafts on said transverse member and the front of the frame; mechanism connecting said transverse shaft and the sprocket thereon, composed of a clutch, a lever actuating the clutch, a ratchet on the lever, and a pawl coöperating with the ratchet; and, rotary cutters composed of parallel disks and oppositely-arranged cutting-blades disposed intermediate of said disks.

2. In a device of the character described, the combination comprising wheels; an axle rigidly secured to the wheels; a frame supported by the wheels; a driven shaft disposed transversely of the frame; a longitudinal shaft geared to said transverse shaft; a second longitudinal shaft actuated by said first longitudinal shaft; longitudinal tie-rods; yokes disposed transversely of the frame and slidably connected to the tie-rods; cutting members, composed of two disks and blades secured intermediate of the disks, rotatable on said longitudinal shafts; a clutch on one of said disks and a clutch on each of said longitudinal shafts; chains connected to said yoke, pulleys guiding the chains and a lever connected to the chains, the said yokes being connected to the said cutting members and arranged to move the same away from and toward the clutch members rigidly secured to said longitudinal shafts.

3. In a machine of the character described, a driving-shaft, a short counter-shaft, sprocket-wheels, a sprocket-chain driving said counter-shaft from the main driving-shaft, a clutch on said counter-shaft normally in engagement with a pawl, a ratchet adapted to hold said clutch out of engagement, longitudinally-extended rotatable shafts with clutches thereon, means for driving the same from said counter-shaft, and rotatable cutting-blades on said longitudinally-extended shafts, said cutting-blades being normally operative while the machine is being operable over the ground.

In witness whereof I have hereunto set my hand in the presence of two witnesses.

EDWARD BELL.

Witnesses:
J. L. HOWSON,
D. FERGUSON.